United States Patent [19]
MacDuff

[11] 3,733,817
[45] May 22, 1973

[54] EMERGENCY PUMP SYSTEM WITH DUPLICATE FLUID LINES

[75] Inventor: Stanley I. MacDuff, Daytona, Fla.

[73] Assignee: The Bendix Corporation, South Bend, Ind.

[22] Filed: June 25, 1971

[21] Appl. No.: 156,721

[52] U.S. Cl. ............. 60/405, 60/54.5 P, 180/79.2 R
[51] Int. Cl. ..................... F15b 15/18, F15b 7/00
[58] Field of Search ............... 60/54.5 P, 54.6 P, 60/54.5 R, 52 S, 52 S; 137/112; 180/79.2 R; 303/84 A, 10, 2

[56] References Cited

UNITED STATES PATENTS

| 2,811,979 | 11/1957 | Presnell | 303/84 A |
|---|---|---|---|
| 2,394,343 | 2/1946 | Vorech | 303/2 |
| 3,280,557 | 10/1966 | Sattavara | 180/79.2 R |
| 3,633,363 | 1/1972 | Larsen | 60/54.6 P |
| 3,131,538 | 5/1964 | Schultz et al. | 60/52 S |
| 3,434,282 | 3/1969 | Shelhart | 60/52 S |
| 2,896,733 | 7/1959 | Rockwell | 60/54.5 P |
| 3,088,284 | 5/1963 | Aaron | 60/52 S |
| 2,954,671 | 10/1960 | Kress | 60/52 S |
| 3,556,242 | 1/1971 | Dollase | 60/52 S |
| 3,579,984 | 5/1971 | Rohde | 60/52 S |
| 3,590,689 | 7/1971 | Brewer | 60/52 S |

*Primary Examiner*—Martin P. Schwadron
*Assistant Examiner*—A. M. Zupcic
*Attorney*—Ken C. Decker et al.

[57] ABSTRACT

A hydraulic power brake and steering system for an automobile in which a primary engine driven pump provides fluid power for normal requirements, and an auxiliary electric motor driven pump provides fluid power in event of failure of the primary system. The system includes flow sensing means to determine when the primary system has failed, and also includes duplicate sets of hydraulic lines and pump reservoirs and a pair of shuttle valves for switching the flow from one set of lines and reservoir to the other depending upon which pump is providing fluid power.

6 Claims, 1 Drawing Figure

PATENTED MAY 22 1973 3,733,817
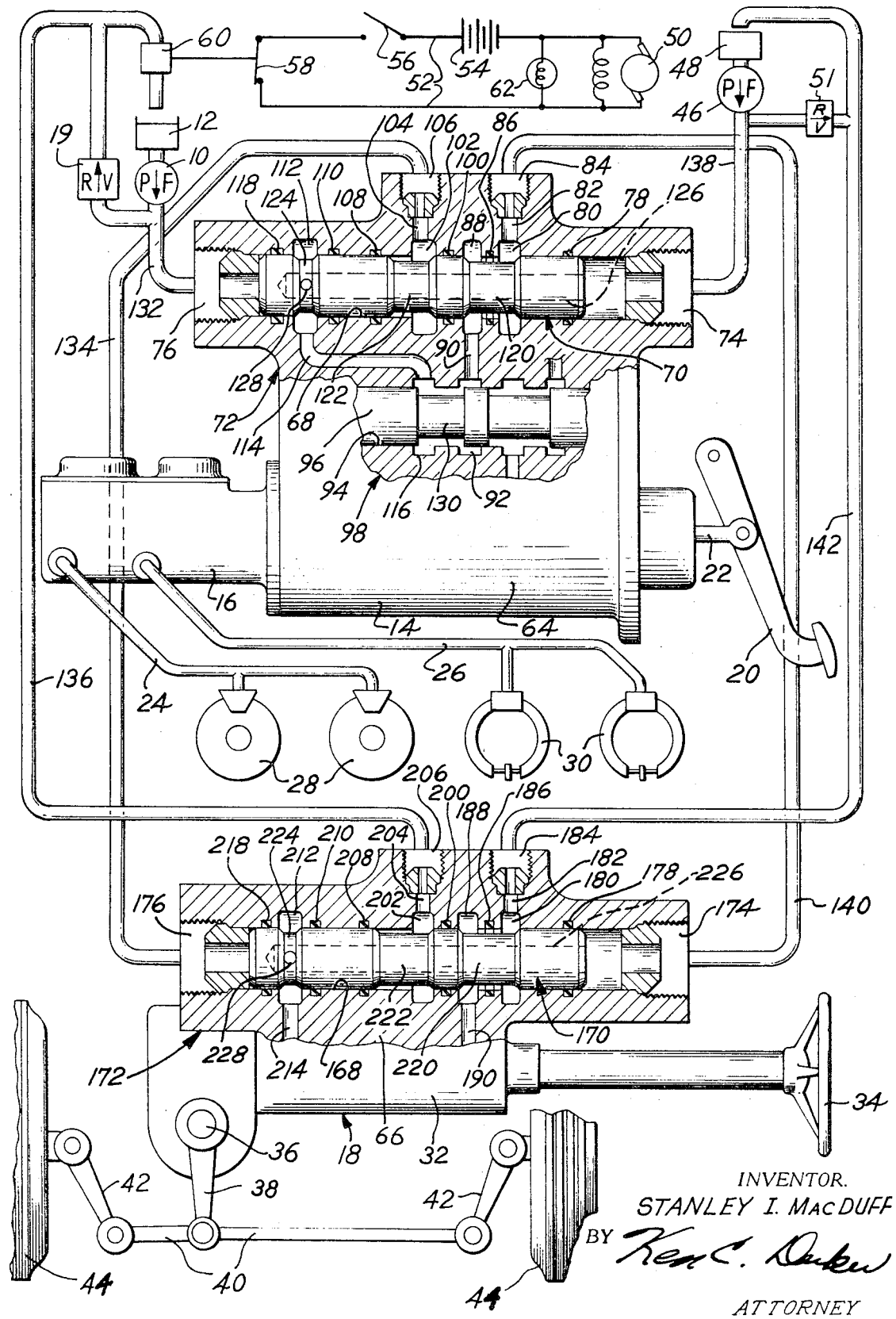
INVENTOR.
STANLEY I. MacDUFF
BY Ken C. Durken
ATTORNEY

EMERGENCY PUMP SYSTEM WITH DUPLICATE FLUID LINES

SUMMARY OF THE INVENTION

This invention relates to an emergency pump system to be used in an automotive vehicle equipped with hydraulic power booster devices such as a conventional open center hydraulic steering gear and a series-parallel hydraulic brake booster. A brake booster of this kind is described in U. S. Pat. application Ser. No. 793,923, filed Jan. 16, 1969, having in common with this application the same assignee. Such systems normally are provided with fluid power from a pump driven by the engine of the vehicle.

An object of the invention is to provide fluid power to the steering gear and brake booster continuously in the event of failure of the normal or primary supply from the engine driven pump. This is accomplished by providing an emergency or auxiliary pump driven by means other than the engine, such as by an electric motor receiving power from the vehicle electrical system. The electric motor is arranged to start in response to signals received from a flow sensing means installed in the primary fluid circuit. The flow sensing means determines whether fluid is flowing in the primary circuit. At any time that fluid is not flowing in the primary circuit and the vehicle ignition switch is closed, the flow sensing means starts the electric motor drive pump to supply a limited quantity of fluid to the system.

A feature of the invention is the provision of duplicate or redundant fluid lines and pump reservoirs, and shuttle valves for switching the flow from one set of lines to the other automatically in dependence upon whether the primary pump or the emergency pump is supplying fluid to the system. Thus, another object of the invention is to provide an emergency or auxiliary pump system which provides protection against a ruptured hose or tube in the primary system.

BRIEF DESCRIPTION OF THE DRAWING

The sole FIGURE of the drawing is a schematic view of a braking system made pursuant to the teachings of my invention with the shuttle valves used therein illustrated in section.

DETAILED DESCRIPTION OF THE INVENTION

Referring to the drawing, there is shown schematically a hydraulic system for an automotive vehicle including an engine driven pump 10 having a reservoir 12, a hydraulic brake booster 14 adapted to operate a conventional dual master cylinder 16, and a hydraulic power steering gear indicated generally by the numeral 18. The pump 10 is provided with a conventional relief valve 19 connected to return fluid to the reservoir 12 if system pressure limits are exceeded. The brake booster 14 is of the type disclosed in aforementioned U. S. Pat. application Ser. No. 793,923, filed Jan. 16, 1969, and is actuated by a brake pedal 20 connected to an actuating plunger 22. The master cylinder 16 is connected by suitable conduits 24 and 26 to front disc brakes 28 and rear drum brakes 30, respectively. The hydraulic power steering gear 18 has a valve 32 of the usual open center type operated by a steering wheel 34. The steering gear 18 has an output shaft 36 on which a pitman arm 38 is mounted. A linkage 40 is connected to steering arms 42 attached to spindles of front wheels 44.

As an important feature of the invention, the system also includes an auxiliary pump 46, having a reservoir 48, and driven by an electric motor 50. The auxiliary pump 46 is provided with a conventional relief valve 51 connected to return fluid to the reservoir 48 if system pressure limits are exceeded. Since the auxiliary pump motor 50, by practical necessity is limited in its power output, the relief valve 51 is preferably set to operate at a pressure substantially less than the pressure at which the primary system relief valve is set. The electric motor 50 is connected in a circuit 52 including the vehicle electric system battery 54, the ignition switch 56 and a switch 58 which is part of a flow sensing means 60. A small light 62 is connected across the terminals of the motor 50.

The brake booster 14 and the power steering valve 32 are each contained in cast metal housings 64 and 66 respectively, which are formed with elongated bores 68 and 168 respectively, containing shuttle valve plungers 70 and 170, respectively. The bores 68 and 168 and the plungers 70 and 170 constitute shuttle valves for the power brake booster 14 and the power steering gear 18. The shuttle valves, which constitute an important feature of the invention, will be designated generally by the numerals 72 and 172. Since the shuttle valves are identical in construction and function, the parts of the shuttle valve 172 which are the same as parts of the shuttle valve 72 will be designated by the same numerals increased by 100. In further description, only the shuttle valve 72 will be referred to but, by adding 100 to the numerals, the description can be read in reference to the shuttle valve 172.

The bore 68 of the shuttle valve 72 is formed at its rightward end (as seen in the drawing) with an auxiliary circuit inlet port 74 and at its leftward end with a primary circuit inlet port 76. Intermediate these ports from right to left are the following elements: an annular groove containing an O-ring 78; an annular groove 80 communicating by a lateral passage 82 with an auxiliary circuit outlet port 84; another O-ring 86; an annular groove 88 communicating by a lateral passage 90 with an annular groove 92 of a bore 94 which, with a plunger 96, constitutes the brake booster valve designated generally by the numeral 98; another O-ring 100; an annular groove 102 communicating by a lateral passage 104 with a primary circuit outlet port 106; two more O-rings 108 and 110 spaced apart a predetermined distance; an annular groove 112 connecting by a lateral passage 114 to an annular groove 116 of the bore 94 of the brake booster valve 98; and an O-ring 118. The plunger 70, which is illustrated in its leftmost position, is formed from right to left with the following elements: a wide groove 120 forming a communication between the annular groove 80 and the annular groove 88; a similar wide groove 122 positioned between the O-rings 100 and 108 and communicating with the annular groove 102; and a narrow groove 124 aligned with the annular groove 112 and thereby communicating by means of the lateral passage 114 with the annular groove 116 of the brake booster valve 98. The groove 124 also communicates with the auxiliary circuit inlet port 74 through a drilled central hole 126 and interconnecting cross-drilled holes 128 in the plunger 70.

The brake booster valve plunger 96 is formed with an annular groove 130 which overlaps the grooves 92 and 116 in the bore 94 when the brake pedal is in the released position. Thus it will be seen that there is free communication between the grooves 92 and 116, and therefore, between the grooves 88 and 112 which are connected to the grooves 92 and 116 by lateral passages 90 and 114. The lateral passage 114 constitutes the inlet connection of the brake booster valve 98 and the lateral passage 90 constitutes the outlet connection of the brake booster valve 98. Detailed description of the brake booster valve 98 and its operation will not be included in this specification as it may be obtained from the above-mentioned U. S. Pat. application Ser. No. 793,923, filed Jan. 16, 1969. Similarly, since the hydraulic power steering gear valve 32 is of the open center type, whose operating characteristics are well known in the art, it will be understood that, when the steering gear is not being operated there is free communication between lateral passages 214 and 190, and therefore, between annular grooves 212 and 188.

The outlet of the primary pump 10 is connected to the primary circuit inlet port 76 of the shuttle valve 72 by a conduit or line 132. The primary circuit outlet port 106 is connected by a line 134 to the primary circuit inlet port 176 of the steering gear shuttle valve 172. The primary circuit outlet port 206 is connected by a line 136 to the reservoir 12 of the primary pump 10. The flow sensing means 60 is positioned in this line 136 near the reservoir 12. It should be noted here that the discharge of the relief valve 19 is connected to the line 136 ahead of the flow sensing means. Flow sensing devices which operate switches are well known in the hydraulic art an it is not considered necessary to illustrate the device 60 in detail or describe it otherwise than by its desired function. The auxiliary pump 46 is connected by a line 138 to the auxiliary circuit inlet port 74 of the shuttle valve 72. The auxiliary circuit outlet port 84 of the shuttle valve 72 is connected by a line 140 to the auxiliary circuit inlet port 174 of the shuttle valve 172. The auxiliary circuit outlet port 184 of the shuttle valve 172 is connected by a line 142 to the reservoir 48 of the auxiliary pump 46.

It should be understood that the lines 132, 134 and 136 may consist of several pieces of metal tubing and flexible hose of suitable types joined together by various fittings which may be threaded or clamped together. The lines 132, 134 and 136 are the same lines that would exist in a conventional automobile equipped with hydraulic power brakes and steering. These lines are subject to failures which result in loss of pressure and of fluid, causing the brake and steering systems to revert to heir conventional manual modes of operation. When this occurs, substantial increases in effort are required of the driver to obtain the desired function. These increases in effort are confusing to drivers, and, in the case of younger drivers and small women, may be beyond the strength of the drivers, causing the defective vehicle to be unsafe in their hands. The addition of the shuttle valves 72 and 172, the auxiliary pump 46 and reservoir 48, and a complete parallel system of lines 138, 140 and 142 protect such drivers and render the operation of the vehicles so equipped safe and free of difficulties, as will be apparent in the following description of the operation of the invention.

OPERATION OF THE INVENTION

In the illustration, the plungers 70 and 170 of the shuttle valves 72 and 172 are in their leftmost position, and it may be assumed that the vehicle engine is not running because the flow sensing switch 58 of the flow sensing means 60 is shown to be closed indicating that there is no flow in the line 136. Now, if the driver closes the ignition switch 56 in preparation for starting the engine, the electrical circuit 52 will be completed and the auxiliary pump motor 50 will start. The light 62, which is mounted on the instrument panel of the vehicle, will come on to indicate that the auxiliary system is working. The motor 50 drives the pump 46 which draws fluid from the reservoir 48 and discharges it into the line 138. The fluid flowing in the line 138 enters the shuttle valve 72 through the port 74 and flows through the drilled passages 126 and 128 into the groove 124. Since the groove 124 is in communication with the groove 112, fluid flows from there through the passage 114 to the brake valve 98. The fluid passes through the annular grooves 116 and 92 of the brake valve bore 94 and the annular groove 130 of the brake valve plunger 96 and re-enters the shuttle valve 72 by means of the lateral passage 90 leading to the annular groove 88. Since the groove 120 of the shuttle valve plunger 70 overlaps both annular grooves 88 and 80, the fluid continues into groove 80, and from there, flows through the lateral passage 82 to the auxiliary circuit outlet port 84. Then the fluid flows through the line 140 to the auxiliary circuit inlet 174 of the steering gear shuttle valve 172. The fluid follows the same path through this shuttle valve 172 as has just been described, passing from the lateral passage 214 through the steering valve 32 to the lateral passage 190 and then to the auxiliary outlet port 184. From the auxiliary outlet port 184 the fluid returns to the reservoir 48 through the line 142. Since the hydraulic fluid is virtually incompressible, it will be understood that the flow occurs in all areas substantially simultaneously and continues as long as the motor 50 is running. If the driver needs to operate the steering gear 18 or the brake booster 14 before the engine is started, they will function with the same ease and effectiveness as would be the case if the engine were running. However, because of the limitation of flow and pressure in the auxiliary system, full emergency stops and turns can not be made without some increased effort. In actual practice, it is found that need for maximum performance very rarely coincides with periods when the driver is relying on the emergency system.

If the driver now proceeds to start the engine, the primary system pump 10 will start to operate. The pump 10 takes fluid from the reservoir 12 and discharges it under pressure to the line 132. Due to the position of the shuttle valve plunger 70 fluid entering the primary circuit inlet port 76 is blocked. The pressure developed by the pump 10 will increase until the relief valve 19 operates, permitting the fluid to flow into the line 136 and back to the reservoir 12 through the flow sensing means 60. The flow through the flow sensing means 60 causes the switch 58 to open, stopping the auxiliary pump motor 50. At the same time the increased pressure of the pump 10 acting on the left end of the plunger 70 exerts a force on the plunger urging it to the right. This force will be greater than any force that may be exerted on the right hand end of the plunger 70 by pressure from the auxiliary pump 46, because, as previously stated, the auxiliary pump relief valve 51 is set at a lower pressure than the relief valve 19 of the primary pump 10. Consequently, the plunger 70 will be moved instantly to its rightmost position, causing changes in the relative positions of the grooves and passages of the shuttle valve 72 as follows: the left end of the plunger 70 moves into the annular groove 112, permitting fluid from the primary circuit inlet port 76 to pass into the groove 112 and then into the lateral passage 114 leading to the brake booster valve 98; the narrow groove 124 of the plunger 70 moves into a position between the O-rings 110 and 108, thereby sealing off further flow of fluid into the auxiliary circuit inlet port 74; the wide groove 122 of the plunger 70 moves to a position where it overlaps both annular grooves 102 and 88 of the bore 68 so that fluid leaving the power brake booster valve via the lateral passage 90 now flows to the primary circuit outlet port 106 and the line 134; and the wide groove 120 of the plunger 70 moves to a position between the O-rings 86 and 78, thereby sealing off exit of fluid to the auxiliary circuit outlet port 84. The fluid that is now attempting to flow through the line 134 is initially blocked by the leftward position of the plunger 170 of the steering gear shuttle valve 172. The resulting pressure in the line 134 shifts the plunger 170 in the same way as has just been described relative to the plunger 70. With the plunger 170 in its rightmost position, the flow to the steering valve 32 is from the primary circuit inlet port 176 to the primary circuit outlet port 206, and flow in the auxiliary circuit is blocked. Now the power brake booster 14 and the steering gear 18 will operate normally and at their full capacity.

If the engine stalls while the vehicle is in motion, or if a hose or tube ruptures, or if a joint, fitting, seal or connection leaks, flow in the line 136 ceases. The flow sensing means 60 then closes the switch 58 to start the motor 50 which operates the pump 46. Since the primary system is without flow, and consequently is also without pressure, the auxiliary system will develop enough pressure to shift the plungers 70 and 170 instantly back to their leftmost positions. This restores the flow paths first described so that operation of the brakes and steering can be carried on using power from the auxiliary circuit. It should be noted that the several O-rings provide positive sealing of the plungers 70 and 170 and the bores 68 and 168 to segregate the two systems from each other, so that a failure in one of the systems does not affect the other system. The warning light 62 informs the driver when the vehicle is operating on the auxiliary system so that repairs can be made to the primary system when needed. Failure of the warning light to come on during the period when the ignition switch is closed but the engine has not started will indicate need of repair of the auxiliary system.

I claim:

1. In an automotive vehicle equipped with power steering and power brake devices normally supplied pressurized fluid by a primary fluid circuit including an engine driven pump, an emergency pump system comprising:

an auxiliary circuit including an auxiliary pump having drive means other than the engine;

first valve means having first and second inlets connected to receive pressurized output fluid flow from said engine driven and auxiliary pumps, respectively, and first and second outlets adapted to be communicated with said first and second inlets, respectively;

second valve means having third and fourth inlets connected to said first and second outlets, respectively, and third and fourth outlets adapted to be communicated with said third and fourth inlets, respectively;

first passage means connecting said third outlet with the inlet of said engine driven pump;

second passage means connecting said fourth outlet with the inlet of said auxiliary pump;

said first valve means being responsive to the pressure differential between said first and second inlets and having a first position in response to said first inlet pressure exceeding said second inlet pressure whereby communication between said first inlet and said first outlet is established and a second position in response to said second inlet pressure exceeding said first inlet pressure whereby communication between said second inlet and said second outlet is established;

said second valve means being actuated in response to pressurization of said first outlet port to a first position whereby said third inlet port is communicated with said third outlet and actuated in response to pressurization of said second outlet port to a second position whereby said fourth inlet is communicated with said fourth outlet;

said first and second valve means being provided with fluid passage means connecting the same with said power brake mechanism and said power steering mechanism, respectively, whereby both of the latter mechanisms are supplied pressurized fluid from one of said primary and auxiliary circuits depending upon the position of said first valve means; and flow responsive means operatively connected to said primary circuit for sensing flow therethrough and operatively connected to said auxiliary pump for rendering said auxiliary pump inoperative in response to a predetermined flow through said primary fluid circuit, said auxiliary pump becoming operative in the event said predetermined flow through said primary circuit is not attained.

2. The invention of claim 1 in which the engine driven pump and the auxiliary pump are provided with separate fluid reservoirs.

3. The invention of claim 1 in which the auxiliary pump is driven by a battery powered electric motor having an electrical control circuit including first switch means actuated by said flow responsive means.

4. The invention of claim 1 wherein:

said first and second valve means each include a casing having a bore;

a valve member having a plurality of spaced apart land portions slidably carried in said bore and first and second end portions exposed to said first and second inlets, respectively;

said first end portion adapted to seat against said associated first and third inlets to block flow therethrough and against said associated second and fourth inlets to block flow therethrough depending upon the position of said valve means associated therewith.

5. The invention of claim 3 wherein vehicle engine ignition switch means is connected in said electrical control circuit in series relationship with said first switch means to cause energization of said electric motor in response to closing of said first switch means and said ignition switch means and de-energization of said electric motor in response to opening of one of said first switch means and ignition switch means.

6. The invention of claim 1 and further including:
third passage means including a first fluid pressure relief valve connecting the outlet of said engine driven pump with said first passage means;
fourth passage means including a second fluid pressure relief valve connecting the outlet of said auxiliary pump with said second passage means;
said second fluid pressure relief valve operative to open at a lower fluid pressure than said first fluid pressure relief valve.

* * * * *